(12) United States Patent
Wu et al.

(10) Patent No.: US 12,731,989 B2

(45) Date of Patent: Sep. 8, 2026

(54) POWER SYSTEM CONTROL METHOD, POWER SYSTEM AND RELATED PRODUCTS

(71) Applicant: CONTEMPORARY AMPEREX TECHNOLOGY (HONG KONG) LIMITED, Hong Kong (CN)

(72) Inventors: Kai Wu, Ningde (CN); Nan Xu, Ningde (CN); Miaomiao Zhang, Ningde (CN); Xin Li, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 0 days.

(21) Appl. No.: 19/039,051

(22) Filed: Jan. 28, 2025

(65) Prior Publication Data

US 2025/0174989 A1 May 29, 2025

Related U.S. Application Data

(63) Continuation of application No. PCT/CN2022/113565, filed on Aug. 19, 2022.

(51) Int. Cl.
*H02J 1/10* (2026.01)
*H02J 3/38* (2026.01)

(52) U.S. Cl.
CPC ................ *H02J 1/106* (2020.01); *H02J 3/38* (2013.01)

(58) Field of Classification Search
CPC ...... H02J 1/106; H02J 3/38; H02J 3/32; H02J 7/35; H02J 2300/24; H02J 3/381
See application file for complete search history.

(56) References Cited

U.S. PATENT DOCUMENTS

2016/0259314 A1* 9/2016 Dhople .................. H02M 7/44
2019/0173284 A1* 6/2019 Tsuruma .................. H02J 7/35

FOREIGN PATENT DOCUMENTS

| | | | |
|---|---|---|---|
| CA | 2976693 | A1 | 4/2017 |
| CN | 108695870 | A | 10/2018 |
| CN | 112838608 | A | 5/2021 |
| CN | 114024373 | A | 2/2022 |
| EP | 2587623 | A1 | 5/2013 |

OTHER PUBLICATIONS

The World Intellectual Property Organization (WIPO) International Search Report and Written Opinion for PCT/CN2022/113565 Apr. 28, 2023 13 Pages (including translation).
The European Patent Office (EPO) The Extended European Search Report for Application No. 22955377.1 Sep. 23, 2025 8 Pages.

* cited by examiner

*Primary Examiner* — Regis J Betsch
*Assistant Examiner* — Alex W Lam
(74) *Attorney, Agent, or Firm* — ANOVA LAW GROUP, PLLC

(57) ABSTRACT

A power system includes a first current conversion module and a second current conversion module, obtains, in response to a determination of obtaining electric energy from the power grid for the electric energy module, electric energy from the power grid through the first current conversion module, and release, in response to a determination of releasing electric energy from the electric energy module to the power grid, electric energy to the power grid through the first current conversion module and the second current conversion module.

16 Claims, 7 Drawing Sheets

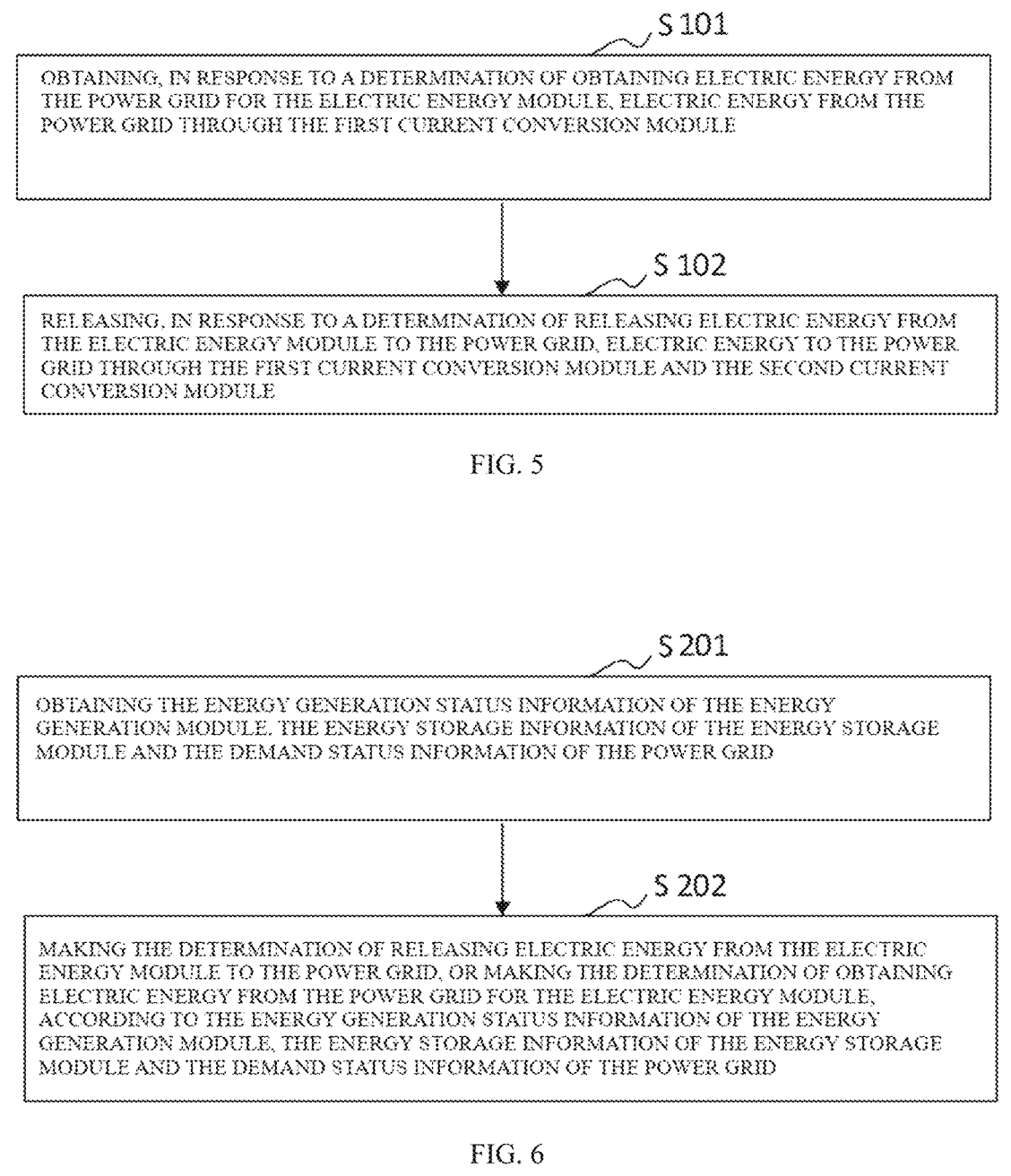

S101

OBTAINING, IN RESPONSE TO A DETERMINATION OF OBTAINING ELECTRIC ENERGY FROM THE POWER GRID FOR THE ELECTRIC ENERGY MODULE, ELECTRIC ENERGY FROM THE POWER GRID THROUGH THE FIRST CURRENT CONVERSION MODULE

S102

RELEASING, IN RESPONSE TO A DETERMINATION OF RELEASING ELECTRIC ENERGY FROM THE ELECTRIC ENERGY MODULE TO THE POWER GRID, ELECTRIC ENERGY TO THE POWER GRID THROUGH THE FIRST CURRENT CONVERSION MODULE AND THE SECOND CURRENT CONVERSION MODULE

OBTAINING THE ENERGY GENERATION STATUS INFORMATION OF THE ENERGY GENERATION MODULE, THE ENERGY STORAGE INFORMATION OF THE ENERGY STORAGE MODULE AND THE DEMAND STATUS INFORMATION OF THE POWER GRID

S202

MAKING THE DETERMINATION OF RELEASING ELECTRIC ENERGY FROM THE ELECTRIC ENERGY MODULE TO THE POWER GRID, OR MAKING THE DETERMINATION OF OBTAINING ELECTRIC ENERGY FROM THE POWER GRID FOR THE ELECTRIC ENERGY MODULE, ACCORDING TO THE ENERGY GENERATION STATUS INFORMATION OF THE ENERGY GENERATION MODULE, THE ENERGY STORAGE INFORMATION OF THE ENERGY STORAGE MODULE AND THE DEMAND STATUS INFORMATION OF THE POWER GRID

FIG. 6

POWER SYSTEM CONTROL METHOD, POWER SYSTEM AND RELATED PRODUCTS

CROSS-REFERENCE TO RELATED APPLICATION

This application is a continuation of International Application No. PCT/CN2022/113565, filed on Aug. 19, 2022, the entire content of which is incorporated herein by reference.

TECHNICAL FIELD

The present disclosure relates to the technical field of electric power, in particular to a power system control method, a power system and related products.

BACKGROUND

Compared with AC coupling, DC coupling may save energy loss and improve energy utilization ratio.

Taking a DC coupled power generation and energy storage power system as an example, in practice, a DC current is output at the DC coupled terminal, while the power grid needs an AC current. Based on this, it is through configuration of an inverter that related technology usually realizes the conversion of a DC current to an AC current.

However, in the related technology, the DC coupled power generation and energy storage power system has the problem of overmatching performance when in use.

SUMMARY

In view of this, it is needed to provide a power system control method, a power system and related products for the above technical problem, so that the performance of the converter configured in the power system is matched with the needs of the power system, and the problem of the overmatching performance of the power system in use is overcome.

In a first aspect, a power system control method, where the power system includes a first current conversion module and a second current conversion module, a DC side of the first current conversion module and a DC side of the second current conversion module are both connected to an electric energy module, and an AC side of the first current conversion module and an AC side of the second current conversion module are both connected to a power grid, the method includes:

obtaining, in response to a determination of obtaining electric energy from the power grid for the electric energy module, electric energy from the power grid through the first current conversion module; and releasing, in response to a determination of releasing electric energy from the electric energy module to the power grid, electric energy to the power grid through the first current conversion module and the second current conversion module.

In the power system control method provided in the embodiment of the disclosure, the power system includes a first current conversion module and a second current conversion module, and obtains electric energy from the power grid through the first current conversion module in response to a determination of obtaining electric energy from the power grid for the electric energy module, and releases electric energy from the power grid through the first current conversion module and the second current conversion module in response to a determination of releasing electric energy from the electric energy module to the power grid. This is equivalent to, by configuring two current conversion modules with different functions, in case where the required flow direction of the electric energy is determined in the power system at different situations, selecting a matching current conversion module to realize obtaining the electric energy or releasing the electric energy, so that the performance of the current converter configured in the power system is matched with what needed by the power system, avoiding the problem of overmatching performance of the power system when in use.

In one of the embodiments, the electric energy module includes an energy generation module and an energy storage module, and the method further includes: obtaining energy generation status information of the energy generation module, energy storage information of the energy storage module and demand status information of the power grid; and making the determination of releasing electric energy from the electric energy module to the power grid, or making the determination of obtaining electric energy from the power grid for the electric energy module, according to the energy generation status information of the energy generation module, the energy storage information of the energy storage module and the demand status information of the power grid.

In the embodiment, by obtaining the energy generation status information of the energy generation module, the energy storage information of the energy storage module and the demand status information of the power grid, it is determined whether to release electric energy from the electric energy module to the power grid or to obtain electric energy from the power grid for the electric energy module. In this way, by combining the specific status of each functional module in the power system to analyze, the determined flow direction of the electric energy is made more accurate.

In one of the embodiments, making the determination of releasing electric energy from the electric energy module to the power grid or making the determination of obtaining electric energy from the power grid for the electric energy module according to the energy generation status information of the energy generation module, the energy storage information of the energy storage module and the demand status information of the power grid includes:

making the determination of releasing electric energy from the electric energy module to the power grid, in case where the demand status information of the power grid is that there is power demand, if the energy generation status information of the energy generation module is in energy-generation, and/or, the energy storage information of the energy storage module meets a preset energy storage condition; and making the determination of obtaining electric energy from the power grid for the electric energy module, in case where the demand status information of the power grid is that there is no power demand, if the energy generation status information of the energy generation module is in stopped energy-generation, and the energy storage information of the energy storage module does not meet the energy storage condition.

In the embodiment, all possible flow directions of the electric energy in the power system are analyzed by combining the different combinations of the energy generation status information of the energy generation module, the energy storage information of the energy storage module and the demand status information of the power grid. Based on this, the relationship condition between the energy generation status information of the energy generation module, the energy storage information of the energy storage module and the demand information of the power grid corresponding to different flow directions of the electric energy are determined. The controller only needs to match the current specific data of the energy generation status information of the energy generation module, energy storage information of the energy storage module and demand status information of the power grid with the relationship condition, and can quickly and accurately determine whether to release electric energy from the electric energy module to the power grid or to obtain electric energy from the power grid for the electric energy module.

In one of the embodiments, the first current conversion module includes at least one first current conversion submodule, the second current conversion module includes at least one second current conversion submodule, and obtaining electric energy from the power grid through the first current conversion module includes:

determining at least one first target current conversion submodule from the respective first current conversion submodule, and obtaining electric energy from the power grid through the respective first target current conversion submodule; and releasing electric energy to the power grid through the first current conversion module and the second current conversion module includes: determining at least one second target current conversion submodule from the respective first current conversion submodule and the respective second current conversion submodule, and releasing electric energy to the power grid through the respective second target current conversion submodule.

In one of the embodiments, determining at least one first target current conversion submodule from the respective first current conversion submodule includes:

selecting first current conversion submodule that meets a preset operating condition from the respective first current conversion submodule as the respective first target current conversion submodule.

In one of the embodiments, determining at least one second target current conversion submodule from the respective first current conversion submodule and the respective second current conversion submodule includes:

selecting first current conversion submodule that meets a preset operating condition from the respective first current conversion submodule, and selecting second current conversion submodule that meets a preset operating condition from the respective second current conversion submodule, to obtain the respective second target current conversion submodule.

In the embodiment, the determination of the target current conversion submodule is made regarding to case where the number of the first current conversion module and the number of the second current conversion module in the power system are different. By setting the manner for judging the target current conversion submodule with different numbers respectively, and the targeted setting improves the accuracy of determining the target current conversion submodule, ensuring the matching between the determined target current conversion submodule and the power system.

In one of the embodiments, the method further includes:

configuring operating power for the respective first target current conversion submodule according to a maximum demand power of the electric energy module.

In one of the embodiments, configuring the operating power for the respective first target current conversion submodule according to the maximum demand power of the electric energy module includes:

obtaining a proportional relationship between rated power of the respective first target current conversion submodule; and dividing, according to the proportional relationship, the maximum demand power, to obtain the operating power of the respective first target current conversion submodule.

In the embodiment, obtain the proportional relationship between the rated power of the respective first target current conversion submodule according to the rated power of the respective first target current conversion submodule, and then divide the maximum demand power of the electric energy module according to the proportional relationship to obtain the operating power configured to the respective first target current conversion submodule. The proportional relationship may reflect the current conversion capacity that the respective first target current conversion submodule may carry, and it can be used as the basis for the respective power configuration, which may avoid the current conversion modules from overload and damage. And by taking the respective carrying capacity as the basis for the respective power configuration, the power configuration may be made more reasonable.

In one of the embodiments, the method further includes:

configuring operating power for the respective second target current conversion submodule according to a maximum output power of the electric energy module.

In one of the embodiments, configuring the operating power for the respective second target current conversion submodule according to the maximum output power of the electric energy module includes:

obtaining a proportional relationship between rated power of the respective second target current conversion submodule; and dividing, according to the proportional relationship, the maximum output power, to obtain the operating power of the respective second target current conversion submodule.

In the embodiment, obtain the proportional relationship between the rated power of the respective second target current converter submodule according to the rated power of the respective second target current conversion submodule, and then divide the maximum output power of the electric energy module according to the proportional relationship to obtain the operating power configured to the respective second target current conversion submodule. The proportional relationship may reflect the current conversion capacity that the respective second target current conversion submodule may carry, and it can be used as the basis for the respective power configuration, which may avoid the current conversion module from overload and damage. And by taking the respective carrying capacity as the basis for the respective power configuration, the power configuration may be made more reasonable.

In one of the embodiments, the first current conversion module is used to convert a DC current output by the electric energy module into an AC current, or convert an AC current output by the power grid into a DC current; and the second current conversion module is used to convert a DC current output by the electric energy module to an AC current.

In a second aspect, the embodiments of the disclosure provide a power system. The power system includes a first current conversion module and a second current conversion module, a DC side of the first current conversion module and a DC side of the second current conversion module are both connected to an electric energy module, and an AC side of the first current conversion module and an AC side of the second current conversion module are both connected to a power grid;

the first current conversion module is used for obtaining electric energy from the power grid for the electric energy module; and the first current conversion module and the second current conversion module are used for releasing electric energy from the electric energy module to the power grid.

The power system provided in the embodiments of the disclosure includes a first current conversion module and a second current conversion module, and obtains electric energy from the power grid through the first current conversion module in response to a determination of obtaining electric energy from the power grid for the electric energy module, and releases electric energy from the power grid through the first current conversion module and the second current conversion module in response to a determination of releasing electric energy from the electric energy module to the power grid. This is equivalent to, by configuring two current conversion modules with different functions, in case where the required flow direction of the electric energy is determined in the power system at different situations, selecting a matching current conversion module to realize obtaining the electric energy or releasing the electric energy, so that the performance of the current converter configured in the power system is matched with what needed by the power system, avoiding the problem of overmatching performance of the power system when in use.

In one of the embodiments, the power system further includes a controller which is connected with the first current conversion module and the second current conversion module respectively;

the controller is used for obtaining electric energy from the power grid through the first current conversion module in response to obtaining electric energy from the power grid for the electric energy module, and releasing electric energy to the power grid through the first current conversion module and the second current conversion module in response to releasing electric energy from the electric energy module to the power grid.

In one of the embodiments, the above power system includes an energy generation module and an energy storage module; the energy generation module is connected with the energy storage module, the energy generation module is connected with the DC side of the first current conversion module and the DC side of the second current conversion module respectively, and the energy storage module is connected with the DC side of the first current conversion module and the DC side of the second current conversion module respectively.

In one of the embodiments, the above power system further includes a first expansion interface and a second expansion interface; the first expansion interface is used for increasing number of first current conversion submodule in the first current conversion module; and the second expansion interface is used for increasing number of second current conversion submodule in the second current conversion module.

In a third aspect, the embodiments of the disclosure provide a power system control device, which device includes:

an electric energy obtaining module, which is used for obtaining electric energy from the power grid through the first current conversion module in response to the determination of obtaining electrical energy from the power grid for the electric energy module;

an electric energy releasing module, which is used for releasing electric energy to the power grid through the first current conversion module and the second current conversion module in response to the determination of releasing electric energy from the electric energy module to the power grid.

In a fourth aspect, the embodiments of the disclosure provide a computer device including a memory and a processor, where a computer program is stored in the memory, and when executing the computer program, the processor implements the steps of the method in any embodiment according to the first aspect.

In a fifth aspect, the embodiments of the disclosure provide a computer-readable storage medium on which a computer program is stored, where when being executed by a processor, the computer program implements the steps of the method in any embodiment according to the first aspect.

In a fifth aspect, the embodiments of the disclosure provide a computer program product including a computer program, where when being executed by a processor, the computer program implements the steps of the method in any embodiment according to the first aspect.

The above description is only an overview of the technical solutions of the disclosure. For purposes of better understanding the technical means of the disclosure, the implementation in accordance with the contents of the specification, and making the above and other purposes, features and advantages of the disclosure more apparent, the specific implementations of the disclosure are given below.

BRIEF DESCRIPTION OF THE DRAWINGS

By reading the detailed description of implementations below, various other advantages and benefits will become apparent to those skilled in the art. The accompanying drawings are intended only to indicate the purpose of some implementations and are not considered to be a limitation of the disclosure. Moreover, the same parts are indicated by the same reference numbers throughout the drawings. In the accompanying drawings:

FIG. 5 is a schematic flow chart of a power system control method provided in one embodiment;

FIG. 6 is a schematic flow chart of a power system control method provided in another embodiment;

Figure 1:
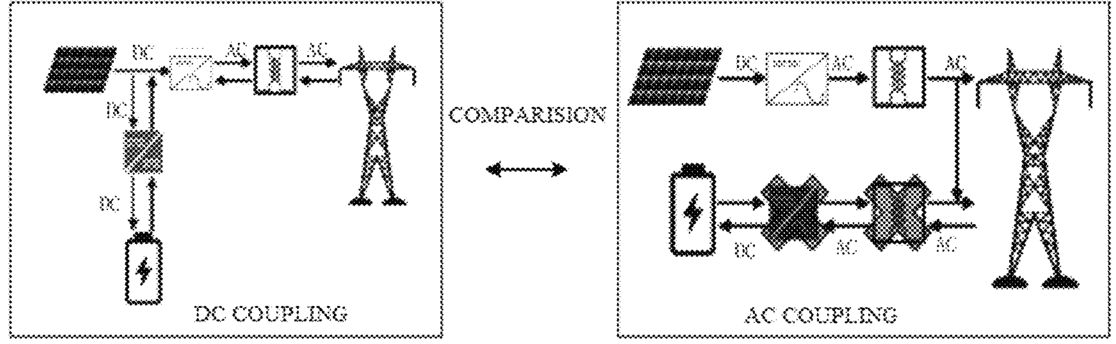
FIG. 1 is a schematic diagram showing comparison between a DC coupled architecture and an AC coupled architecture provided in one embodiment.

The reference numbers are as follows:

10: first current conversion module; 11: second current conversion module;

12: electric energy module; 121: energy generation module;

122: energy storage module; 13: power grid;

14: controller.

DETAILED DESCRIPTION OF THE EMBODIMENTS

The embodiments of the technical solutions of the disclosure will be described in detail with reference to the accompanying drawings below. The following embodiments are intended only to more clearly illustrate the technical solutions of the disclosure and are therefore used as examples only and cannot be used to limit the protection scope of the disclosure.

Unless otherwise defined, all technical and scientific terms used herein have the same meaning as those generally understood by those skilled in the art of this disclosure. The terms used herein are for the purpose of describing specific embodiments only and are not intended to limit the disclosure. The terms "including" and any variations thereof in the specification, claims and the above description of the drawings of this disclosure are intended to cover non-exclusive inclusion.

Reference to "embodiment" herein means that a particular feature, structure or characteristic described in conjunction with an embodiment may be included in at least one embodiment of this disclosure. The presence of the phrase at various positions in the specification does not necessarily refer to a same embodiment, nor is it an independent or alternative embodiment mutually exclusive with other embodiments. It is understood, both explicitly and implicitly, by those skilled in the art that the embodiments described herein may be combined with other embodiments.

In the description of the embodiments of this disclosure, the technical terms "first", "second", and etc., are used only to distinguish between different objects and are not to be construed as indicating or implying relative importance or as implicitly indicating the quantity, particular order or priorities of the indicated technical features. In the description of the embodiments of this disclosure, the term "and/or" is merely an associative relationship describing associated objects, indicating that there can be three relationships, for example, A and/or B can indicate the following three cases: A alone, both A and B, and B alone. In addition, the character "/" herein generally means that the associated objects are in an "or" relationship. In the description of the embodiments of this disclosure, the term "multiple" means more than two (including two), unless otherwise specified.

Because of the shortcomings such as intermittency and uncontrollability in the application of new energy power generation, its large-scale access to the power grid without processing will have a great impact on the power grid, thus affecting the stable operation of the power grid. For example, photovoltaic power generation, hydroelectric power generation, wind power generation and so on. In view of this, the addition of an energy storage on the basis of the power generation may allow the new energy power generation to smoothly and stably output to the power grid, so that the large-scale access to the power grid will not affect the stability of the power grid. Besides, the power system with dual functions of new energy power generation and energy storage may have wider applications.

Take a power system of photovoltaic power generation as an example. There are currently many systems realizing the photovoltaic power generation to the power grid, and the most common two topologies are the DC coupled photovoltaic energy storage system and the AC coupled photovoltaic energy storage system. According to the comparison diagram of the DC coupled photovoltaic energy storage system and the AC coupled photovoltaic energy storage system as shown in FIG. 1, the photovoltaics and energy storage battery in the DC coupled photovoltaic energy storage system share the same DC bus. Compared with the AC coupled photovoltaic energy storage system, there is no need to carry out two current and voltage conversions, which makes the DC coupled photovoltaic energy storage system not only has the advantage of saving the cost of a transformer, but also save energy loss and improve energy utilization.

The applicant has found through study that in related technologies, the inverters configured in the DC coupled photovoltaic energy storage system are configured according to the energy storage battery and the maximum photovoltaic power, and the inverters are all implemented by adopting a bi-directional integrated AC-DC conversion. However, in the process of photovoltaic power generation, photovoltaics only need to discharge and do not need the bi-directional charging and discharging, and energy storage battery need the bi-directional charging and discharging, in this demand, although the bi-directional integrated inverters in the related technology can realize the function of current conversion, it is suitable for being applied in all scenarios, but for the scenario of only unidirectional discharging, there is the problem of overmatching performance of the integrated bi-directional inverters.

Based on this consideration, the embodiments of the disclosure provide a power system control method, where the power system includes a first current conversion module and a second current conversion module, and obtains electric energy from the power grid through the first current conversion module in response to a determination of obtaining electric energy from the power grid for the electric energy module, and releases electric energy to the power grid through the first current conversion module and the second current conversion module in response to a determination of releasing electric energy from the electric energy module to the power grid. This is equivalent to, by configuring two current conversion modules with different functions, in case where the required flow direction of the electric energy is determined in the power system at different situations, select a suitable current conversion module to realize obtaining the electric energy or releasing the electric energy, so that the performance of the current converter configured in the power system is matched with what needed by the power system, avoiding the problem of overmatching performance of the power system when in use.

Further, still take the photovoltaic power generation as an example. The applicant has also found through study that because in practice, in case where one bi-directional DC/AC is configured, the bi-directional DC/AC not only ensures the current conversion function of the photovoltaics' unidirectional discharging to the power grid but also ensures the current conversion function of the energy storage battery's bi-directional charging and discharging, at the same time the use efficiency is not maximized. Such bi-directional DC/AC not only has excessive performance, from the cost dimension, the configuration cost of the bi-directional DC/AC in the related technologies is relatively high, thus resulting in relatively high overall cost of the entire power system.

Based on this consideration, in the power system control method provided in the embodiments of the disclosure, the original integrated bi-directional inverter is changed into modular current conversion modules composed of the unidirectional DC/AC required by the photovoltaics and the bi-directional DC/AC required by the energy storage battery, and the unidirectional DC/AC is selected according to the maximum discharge output power of the photovoltaics, and the bi-directional DC/AC is selected according to the maximum charge and discharge power of the energy storage battery. On this basis, combined with the above power system control method, the performance of the configured current converter can be matched with the needs of the power system, thus greatly reducing the overall cost of the power system.

The technical effects achieved by the power system control method and the power system provided in the embodiments of the disclosure are not limited to this, but also can achieve other technical effects, for example, because the first current conversion module and the second current conversion module in the power system are both configured as modules, which can improve the capacity expansion of the power system. Under the premise of ensuring the cable tolerance, the first current conversion module and the second current conversion module can be expanded to multiple according to the actual demand, which can better cope with the new expansion needs of future energy storage and new energy power generation.

The power system control method provided in the embodiment of the disclosure is applicable to the power system architecture. Based on this, before explaining the power system control method provided in the embodiments of the disclosure, the power system architecture applied in the embodiments of the disclosure is explained first.

Figure 2:
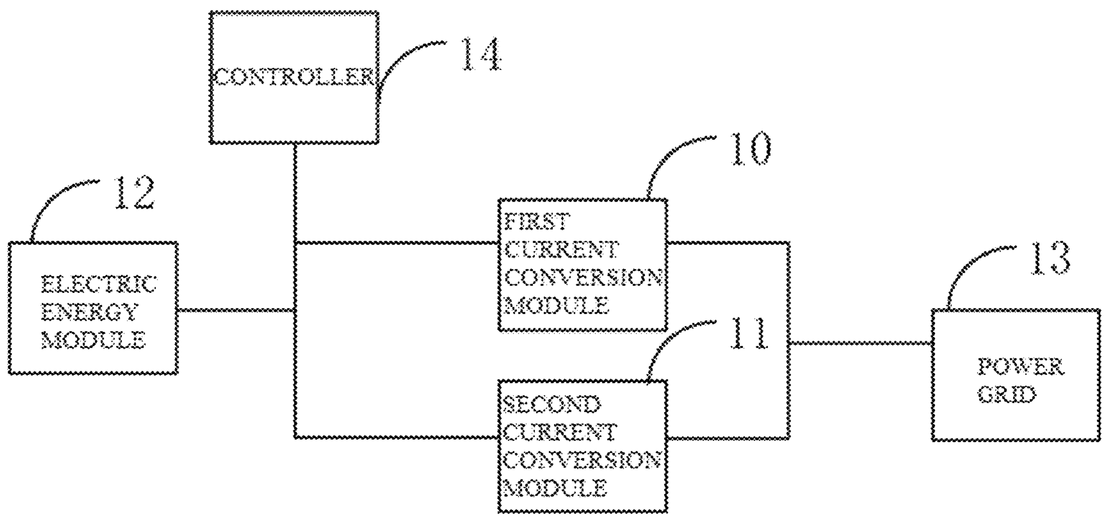
FIG. 2 is the structure diagram of a DC power system provided in one embodiment.

As shown in FIG. 2, which is the structure diagram of a power system provided in the embodiments of the disclosure, the power system includes a first current conversion module 10 and a second current conversion module 11. The DC sides of the first current conversion module 10 and the second current conversion module 11 are both connected to the electric energy module 12, and the AC sides of the first current conversion module 10 and the second current conversion module 11 are both connected to the power grid 13.

Further, the above power system may also include a controller 14, which is connected with the first current conversion module 10 and the second current conversion module 11 respectively. The controller 14 is used for obtaining electric energy from the power grid 13 through the first current conversion module 10 in response to obtaining electric energy from the power grid 13 for the electric energy module 12, and releasing electric energy to the power grid 13 through the first current conversion module 10 and the second current conversion module 11 in response to releasing electric energy from the electric energy module 12 to the power grid 13.

In this case, the controller may be realized as integrated processor, may also be a control system composed of discrete devices, for example, it may be an Energy Management System (EMS) which is a computer-based power scheduling management module, and has functions of collecting the functional modules data in the power system, and analyzing according to the data and performing corresponding control processes. As for the specific realization of the controller, the embodiments of the disclosure constitute no limitation, and it can be determined according to the actual situation.

Figure 3:
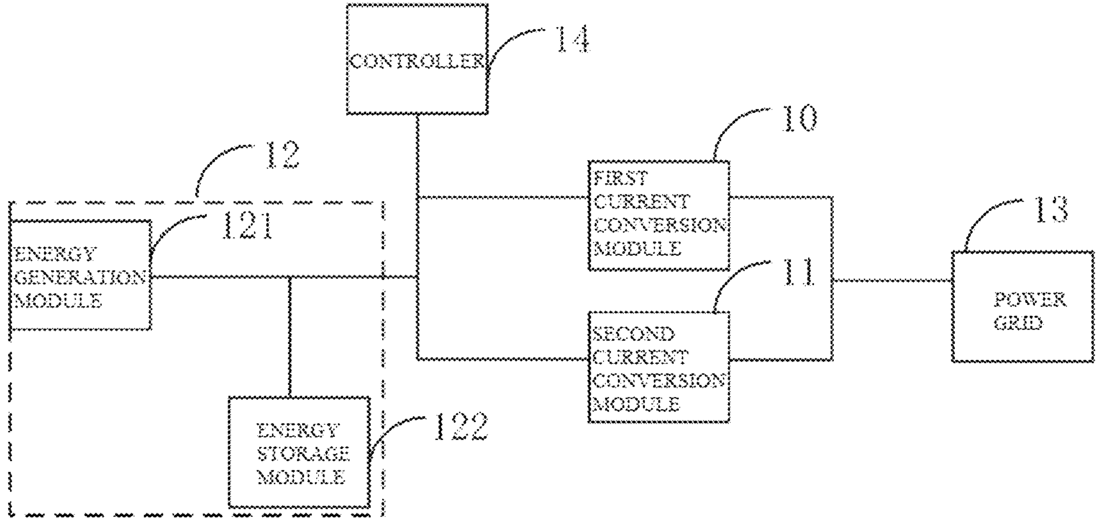
FIG. 3 is the structure diagram of a power system provided in another embodiment.

Optionally, as shown in FIG. 3, the electric energy module 12 includes an energy generation module 121 and an energy storage module 122. The energy generation module 121 is connected with the energy storage module 122, the energy generation module 121 is connected with the DC sides of the first current conversion module 10 and the second current conversion module 11 respectively, and the energy storage module 122 is connected with the DC sides of the first current conversion module 10 and the second current conversion module 11 respectively.

In the embodiments of the disclosure, the electric energy module 12 represents the general module with the functions of electric energy generation and energy storage. In the case of photovoltaic power generation, the electric energy module 12 refers to the general photovoltaic array and energy storage battery, where the photovoltaic array is used to convert light energy (such as solar energy) into electric energy, and the energy storage battery is used to store electric energy. For example, the energy storage battery can use the electric energy generated by the photovoltaic array for energy storage, or use the electric energy in the power grid for energy storage, etc., the embodiments of the disclosure do not limit this.

In this case, the current conversion modules represent modules with the function of converting the DC current and AC current. Optionally, in the embodiments of the disclosure, the first current conversion module is used for obtaining electric energy from the power grid for the electric energy module, and the first current conversion module and the second current conversion module are used for releasing electric energy from the electric energy module to the power grid.

Specifically, the first current conversion module refers to converting the DC current output by the electric energy module into an AC current, or converting the AC current output by the power grid into a DC current. The first current conversion module is a module with a function of bi-directional current conversion, which can be called bi-directional DC/AC. The second current conversion module refers to a module that converts the DC current output by the electric energy module into an AC current. The second current conversion module is a module performing unidirectional current conversion, which can be called unidirectional DC/AC.

In practice, the implementation of the first current conversion module and the second current conversion module can be designed according to different needs, and the embodiments of the disclosure do not limit this, as long as its implemented structure can realize the power system control method provided in the embodiments of the disclosure.

In one embodiment, both the first current conversion module and the second current conversion module may adopt an integrated current converter. That is, the first current conversion module is an integrated unidirectional DC/AC, and the second current conversion module is an integrated bi-directional DC/AC. In this implementation, the number of the first current conversion module and the number of the second current conversion module are both one, and both the bi-directional DC/AC and the unidirectional DC/AC tend to be integrated, which makes the cost realization of the DC coupled photovoltaic energy storage system more advantageous.

In another embodiment, both the first current conversion module and the second current conversion module can be expanded by adding conversion submodules on the original basis. Optionally, the power system of the embodiments of the disclosure also includes a first expansion interface and a second expansion interface, where the first expansion interface is used for increasing the number of the first current conversion submodules in the first current conversion module, and the second expansion interface is used for increasing the number of second current conversion submodules in the second current conversion module.

Specifically, the first expansion interface may be arranged in the original first current conversion module, so that if a new first current conversion submodule needs to be added, the new first current conversion submodule may be connected in parallel into the original first current conversion module through the first expansion interface, so as to realize the expansion of the conversion submodule in the first current conversion module. Similarly, the second expansion interface may be arranged in the original second current conversion module, so that if a new second current conversion submodule needs to be added, the new second current conversion submodule may be connected in parallel into the original second current conversion module through the second expansion interface, thus realizing the expansion of the second current conversion module.

Figure 4:
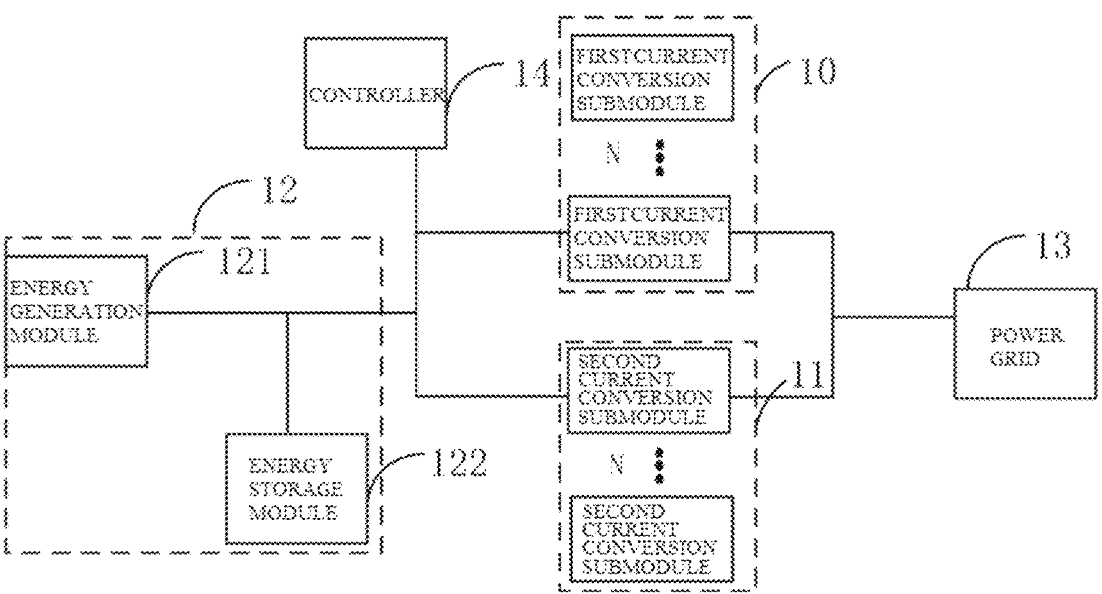
FIG. 4 is the structure diagram of a power system provided in another embodiment.

As shown in FIG. 4, which is the structure diagram showing the expansion of the first current conversion module 10 and the second current conversion module 11, the design may flexibly adjust the number of the first current conversion submodules in the first current conversion module 10 and the number of the second current conversion submodules in the second current conversion module 11 according to the actual demand, so as to achieve the technical effect of flexible combination and expansion.

Of course, it is understood that when performing expansion of the first current conversion module and the second current conversion module in the embodiments of the disclosure, the numbers of expansion of the two modules are not necessarily the same. For example, when the number of the submodule in the first current conversion module is one, the number of submodules in the second current conversion module may be multiple after the expansion. It may also be possible that the number of the submodules in the first current conversion module becomes multiple after the expansion, but the number of the submodule in the second current conversion module is still one. It may also be possible that the submodules in the first current conversion module and the submodules in the second current conversion module have become multiple after the expansion.

In addition, in one embodiment, in order to ensure the maximum efficiency of the current conversion modules in the power system, the selection of the first current conversion module and the second current conversion module may be based on the maximum output power corresponding to the electric energy transfer direction between the power grid and the electric energy module. For example, the first current conversion module is a bi-directional DC/AC, which will be used not only in the process of obtaining electric energy from the power grid for the electric energy module, but also in the process of releasing electric energy from the electric energy module to the power grid. The second current conversion module is a unidirectional DC/AC, which is used in the process of obtaining electric energy from the power grid for the electric energy module. Therefore, when selecting the first current conversion module, its rated power may be determined according to the maximum charging power of the energy storage battery, to ensure that it will not cause overcurrent and damage in the process of charging the energy storage battery from the power grid. Similarly, when selecting the second current conversion module, its rated power may be determined according to the maximum output power during photovoltaics discharging, so as to ensure that the second current conversion module may withstand the maximum output power during the photovoltaics discharging, neither affecting the power system's operation, nor being damaged due to overcurrent.

Further, the first current conversion module and the second current conversion module are selected in the above way, which may ensure that the overall performances of the first current conversion module and the second current conversion module are relatively matched with the needs of the power system, and there will be no problem of excessive performance, so as to maximize the efficiency of the current conversion modules and greatly reduce the overall cost of the DC coupled photovoltaic energy storage system.

It is understood that in the above embodiments the design of the various structures in the power system is only one example to achieve the technical effect of the disclosure, and it may also be adapted to make modifications in practice, to achieve the easy conceivable technical effect, and the embodiments of the disclosure do not limit its structure.

In the following, the power system control methods provided in the embodiments of the disclosure are explained. The power system control methods in the embodiments of the disclosure are all applicable to the power system in FIG. 2 above and are described by taking a controller as the executive body.

In one embodiment, as shown in FIG. 5, the embodiment includes the following steps:

- S101, obtaining, in response to a determination of obtaining electric energy from the power grid for the electric energy module, electric energy from the power grid through the first current conversion module.
- S102, releasing, in response to a determination of releasing electric energy from the electric energy module to the power grid, electric energy to the power grid through the first current conversion module and the second current conversion module.

In the embodiments of the disclosure, the flow directions of the electric energy between the electric energy module and the power grid include two directions that flows from the electric energy module to the power grid and that flows from the power grid to the electric energy module. The flowing from the electric energy module to the power grid refers to releasing electric energy from the electric energy module to the power grid, and flowing from the power grid to the electric energy module refers to obtaining electric energy from the power grid for the electric energy module.

In this case, to determine whether to obtain electric energy from the power grid for the electric energy module or to release electric energy from the electric energy module to the power grid, the controller may perform analysis according to the data such as the electric energy status of the electric energy module and the needs of the power grid.

With regard to obtaining electric energy from the power grid for the electric energy module, because it is a process of the power grid charging the electric energy module, the current converter needs to convert the AC current output by the power grid into the DC current required by the electric energy module, while the second current conversion module can only realize the unidirectional conversion from DC to AC, so in this mode, it may be determined that the current conversion module required to operate is based on the first current conversion module, so in this case, it is through the first current conversion module to obtain electric energy from the power grid.

With regard to the determination of releasing electric energy from the electric energy module to the power grid, because it is a process of electric energy module generating power to the power grid, the current converter needs to convert the DC current output by the electric energy module into the AC current required by the power grid, while both the first current conversion module and second current conversion module can achieve this function of current conversion. In this mode, it may be determined that the current conversion modules required to operate are simultaneously based on the first current conversion module and the second current conversion module, so in this case, it is through the first current conversion module and the second current conversion module to release electric energy to the power grid.

In the power system control method provided in the embodiment of the disclosure, the power system includes a first current conversion module and a second current conversion module, and obtains electric energy from the power grid through the first current conversion module in response to a determination of obtaining electric energy from the power grid for the electric energy module, and releases electric energy from the power grid through the first current conversion module and the second current conversion module in response to a determination of releasing electric energy from the electric energy module to the power grid. This is equivalent to, by configuring two current conversion modules with different functions, in case where the required flow direction of the electric energy is determined in the power system at different situations, selecting a matching current conversion module to realize obtaining the electric energy or releasing the electric energy, so that the performance of the current converter configured in the power system is matched with what needed by the power system, avoiding the problem of overmatching performance of the power system when in use.

Based on the above embodiments, the following uses specific embodiments to illustrate the above process of the determination of obtaining electric energy from the power grid for the electric energy module or the determination of releasing electric energy from the electric energy module to the power grid. Then, as shown in FIG. 6, in one embodiment, the method also includes:

S201, obtaining the energy generation status information of the energy generation module, the energy storage information of the energy storage module and the demand status information of the power grid.

In this embodiment, take the above electric energy module including the energy generation module and the energy storage module as an example to illustrate.

Take the energy generation module as a photovoltaic array and the energy storage module as an energy storage battery, then:

The energy generation status information of the energy generation module may be the status whether the photovoltaic array is generating power. Naturally, its energy generation status includes two status: in energy-generation (that is, the photovoltaic array is in the status of generating power) or in stopped energy-generation (that is, the photovoltaic array is not generating power).

The energy storage information of the energy storage module may be the amount of energy stored in the energy storage battery, which may be divided into sufficient energy storage and insufficient energy storage.

The demand status information of the power grid may be the status whether there is power demand in the power grid, which may be divided into two kinds: there is power demand and there is no power demand.

In practice, the controller may determine the energy generation status information by detecting whether the energy generation module has electric energy. For example, if the photovoltaic array has electric energy, it indicates that it is in energy-generation, otherwise it is determined that the photovoltaic array is in stopped energy-generation. The controller may detect the amount of energy in the energy storage battery, if the energy storage battery is full, it is determined that the energy storage information of the energy storage battery is sufficient, that is, meeting the preset energy storage conditions, otherwise it is determined that the energy storage battery is insufficient, that is, not meeting the preset energy storage conditions. Then the controller may also detect whether there is power demand in the current power grid to determine the demand status information of the power grid.

S202: making the determination of releasing electric energy from the electric energy module to the power grid, or making the determination of obtaining electric energy from the power grid for the electric energy module, according to the energy generation status information of the energy generation module, the energy storage information of the energy storage module and the demand status information of the power grid.

Based on the energy generation status information of the energy generation module, the energy storage information of the energy storage module and the demand status information of the power grid determined above, the controller may make an analysis based on this, and conclude to release electric energy from the electric energy module to the power grid or to obtain electric energy from the power grid for the electric energy module.

In one embodiment, the controller may prebuild and store an algorithm model, and then the controller inputs the determined specific data of the energy generation status information of the energy generation module, the energy storage information of the energy storage module and the demand status information of the power grid into the algorithm model, and directly outputs through the algorithm model that currently required is in releasing electric energy from the electric energy module to the power grid, or in obtaining electric energy from the power grid for the electric energy module.

In another embodiment, the controller may match the current specific data of the energy generation status information of the energy generation module, the energy storage information of the energy storage module, and the demand status information of the power grid with the prebuilt setting conditions, and determine the matched setting condition to be releasing electric energy from the electric energy module to the power grid or obtaining electric energy from the power grid for the electric energy module.

In the embodiment, by obtaining the energy generation status information of the energy generation module, the energy storage information of the energy storage module and the demand status information of the power grid, it is determined whether to release electric energy from the electric energy module to the power grid or to obtain electric energy from the power grid for the electric energy module. In this way, by combining the specific status of each functional module in the power system to analyze, the determined flow direction of the electric energy is made more accurate.

In the following, with reference to the above FIG. 2, and taking photovoltaic power generation as an example, the above analysis method is explained in detail by analyzing the photovoltaic array, energy storage battery and power grid in different status. In the embodiment, for ease of understanding, still take the first current conversion module as the bi-directional DC/AC, and the second current conversion module as the unidirectional DC/AC.

Specifically, the energy generation status information of the photovoltaic array and the power demand information of the power grid may be divided into four categories of combination cases:

(1) The energy generation status information of the photovoltaic array is in energy-generation, and there is power demand in the power grid.

In this case, it is possible to continue to divide into two types according to the amount of energy generated by the photovoltaic array:

A, the amount of energy generated by the photovoltaic array is greater than or equal to the power demand of the power grid.

Figure 7:
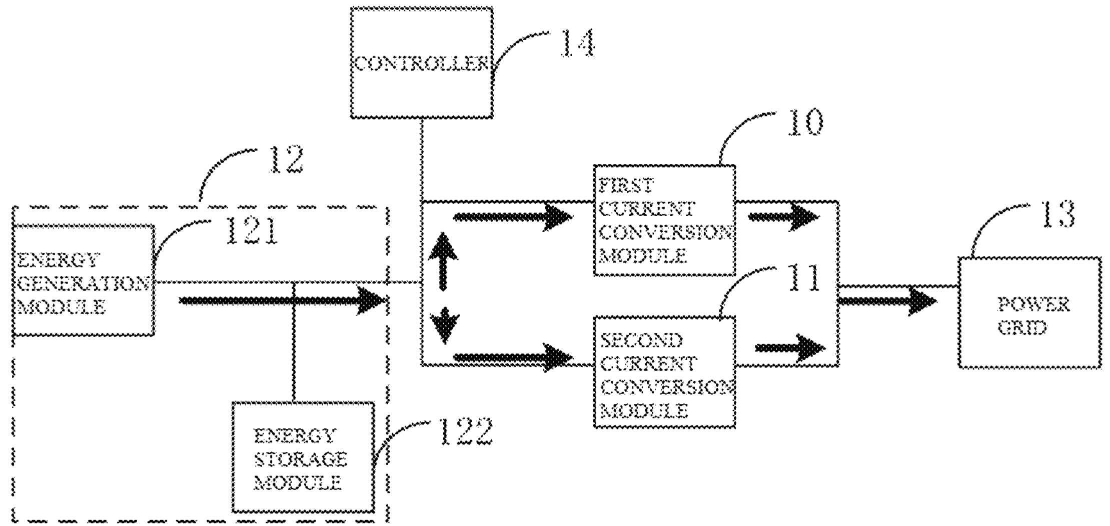
FIG. 7 is a schematic diagram showing the flow direction of the electric energy in the power system provided in one embodiment.

If the energy storage battery has sufficient energy storage, then the photovoltaic array in the DC coupled photovoltaic energy storage system discharges to the power grid through the unidirectional DC/AC and the bi-directional DC/AC, and the energy storage battery does not work, please refer to the arrow in FIG. 7.

Figure 8:
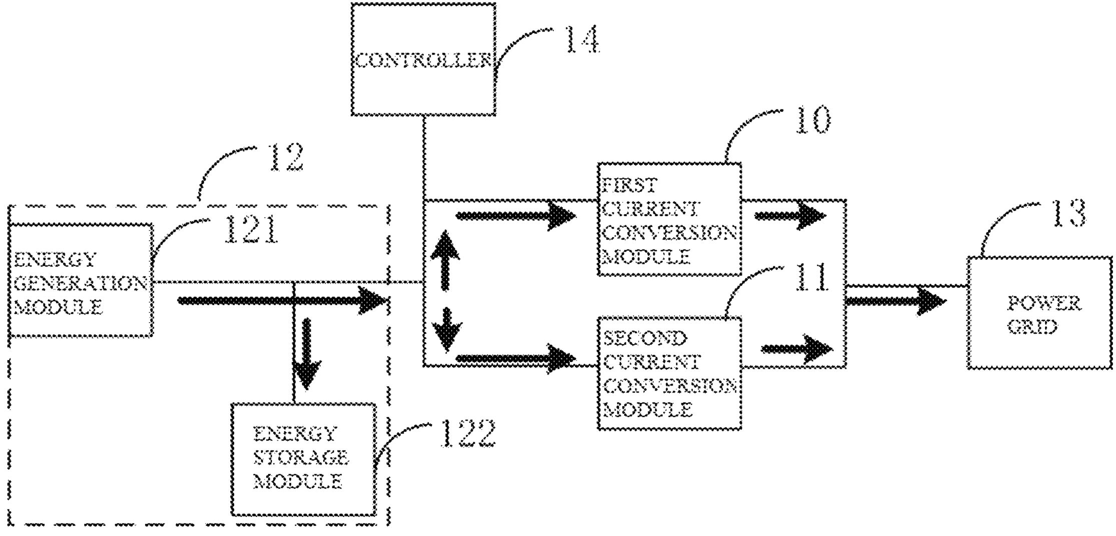
FIG. 8 is a schematic diagram showing the flow direction of the electric energy in the power system provided in another embodiment.

If the energy storage battery has insufficient energy storage, then the photovoltaic array in the DC coupled photovoltaic energy storage system discharges to the power grid through the unidirectional DC/AC and the bi-directional DC/AC, and at the same time the photovoltaic array charges the energy storage battery, please refer to the arrow indicated in FIG. 8.

B. the amount of energy generated by the photovoltaic array is less than the power demand of the power grid.

Figure 9:
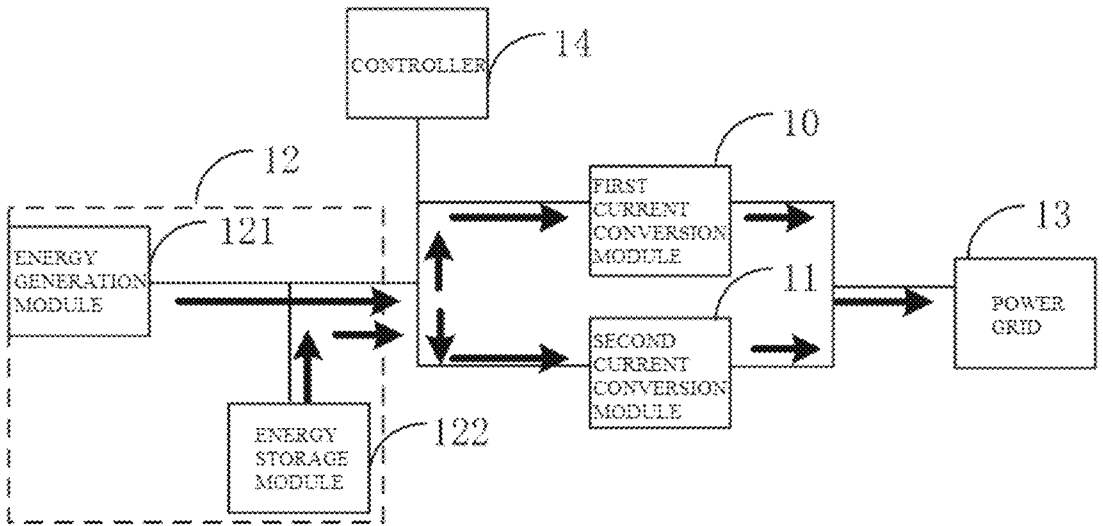
FIG. 9 is a schematic diagram showing the flow direction of the electric energy in the power system provided in another embodiment.

If the storage energy battery has sufficient energy storage, then the photovoltaic array and the energy storage battery in the DC coupled photovoltaic energy storage system discharge to the power grid through the unidirectional DC/AC and the bi-directional DC/AC, please refer to the arrow in FIG. 9.

If the energy storage battery has insufficient energy storage, then the photovoltaic array in the DC coupled photovoltaic energy storage system discharges to the power grid through the unidirectional DC/AC and the bi-directional DC/AC, and the energy storage battery does not work, please continue to refer to FIG. 7 above.

(2) The energy generation status information of the photovoltaic array is in energy-generation, and there is no power demand in the power grid.

In this case, because there is no power demand in the power grid, there is no need to use the current conversion module. Then it is possible to divide into:

If the energy storage battery has sufficient energy storage, the entire DC coupled photovoltaic energy storage system and the power grid do not work. That is, there is no electric energy interaction.

Figure 10:
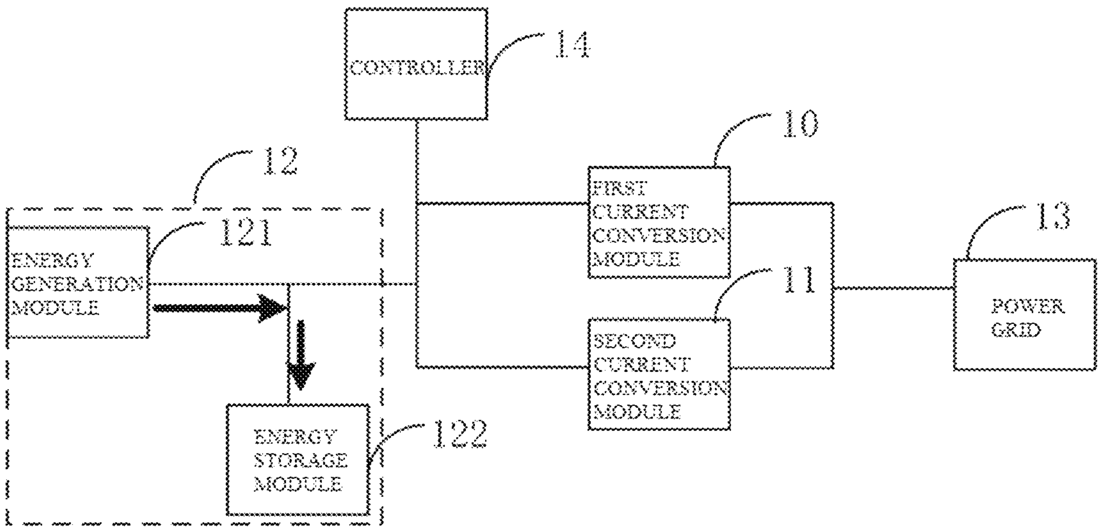
FIG. 10 is a schematic diagram showing the flow direction of the electric energy in the power system provided in another embodiment.

If the energy storage battery has insufficient energy storage, then the photovoltaic array in the DC coupled photovoltaic energy storage system charges the energy storage battery at this time, please refer to the arrow indicated in FIG. 10.

(3) The energy generation status information of the photovoltaic array is in stopped energy-generation, and there is power demand in the power grid.

Figure 11:
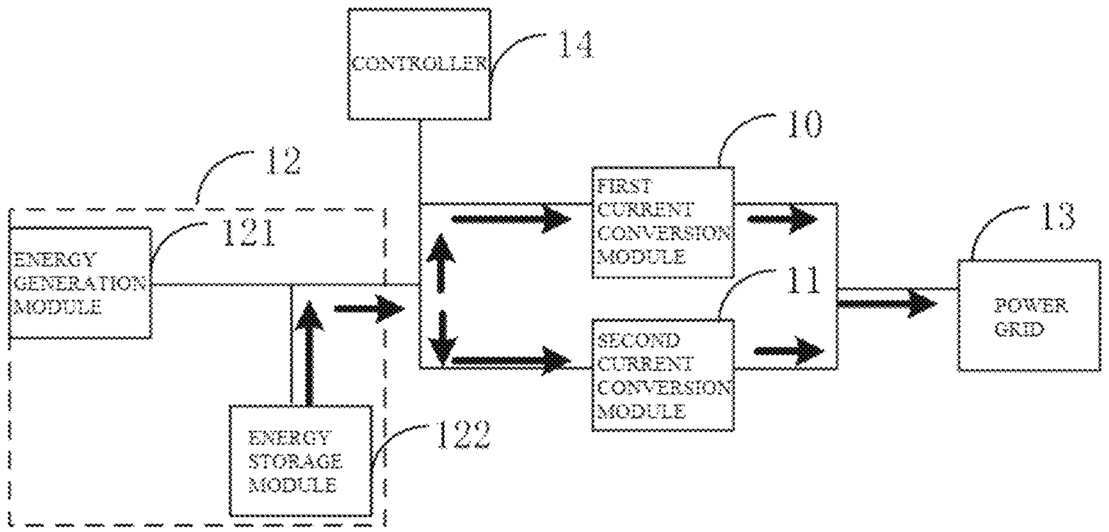
FIG. 11 is a schematic diagram showing the flow direction of the electric energy in the power system provided in another embodiment.

In this case, because the photovoltaic array does not generate electric energy, there is no need to consider the photovoltaic array. Then it is possible to divide into:

If the energy storage battery has sufficient energy storage, then the energy storage battery in the DC coupled photovoltaic energy storage system discharges to the power grid through the unidirectional DC/AC and the bi-directional DC/AC at this time, please refer to the arrow indicated in FIG. 11.

Figure 12:
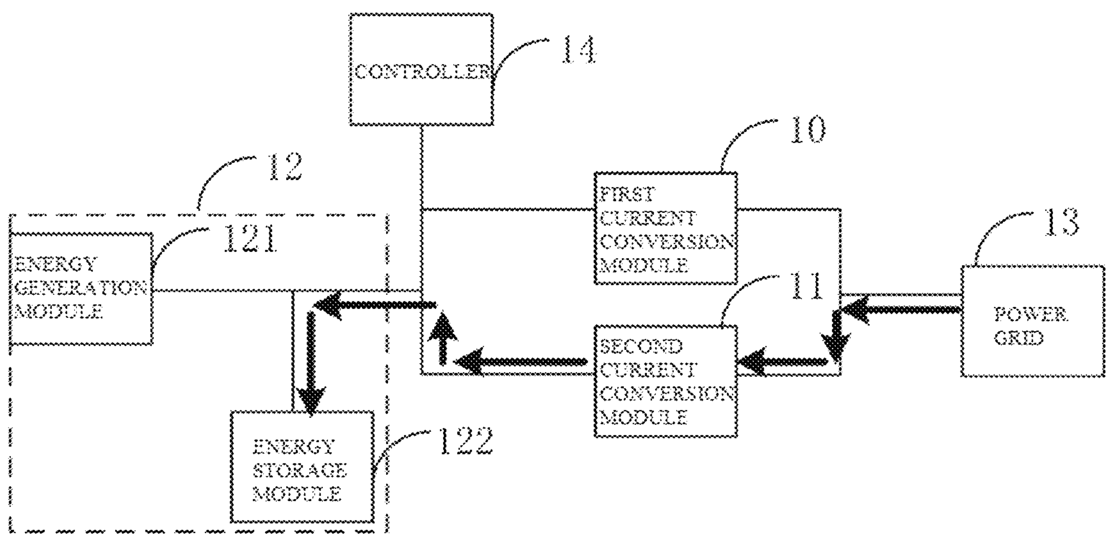
FIG. 12 is a schematic diagram showing the flow direction of the electric energy in the power system provided in another embodiment.

If the storage energy battery has insufficient energy storage, then the power grid in the DC coupled photovoltaic energy storage system charges the energy storage battery through the bi-directional DC/AC at this time, please refer to the arrow indicated in FIG. 12.

(4) The energy generation status information of the photovoltaic array is in stopped energy-generation, and there is no power demand in the power grid.

In this case there is also no need to use the current conversion module because there is no power demand in the power grid. Then it is possible to divide into:

If the energy storage battery has sufficient energy storage, the entire DC coupled photovoltaic energy storage system and the power grid do not work, that is, there is no electric energy interaction.

If the energy storage battery has insufficient energy storage, then the power grid in the DC coupled photovoltaic energy storage system charges the energy storage battery at this time, please refer to FIG. 12 above.

In all the above cases, as long as there is a flow of electric energy, it is achieved by the controller controlling the on or off of the unidirectional DC/AC and the bi-directional DC/AC. It should be noted that the DC/DC conversion module between the photovoltaic array and the energy storage battery is not shown in the accompanying drawings of the embodiments of the disclosure, but it should be understood that the charging of the energy storage battery by the photovoltaic array is also realized by the controller controlling the on or off of the DC/DC conversion module.

Based on the above analysis of different electric energy interactions, in one embodiment, the determination of releasing electric energy from the electric energy module to the power grid or the determination of obtaining electric energy from the power grid for the electric energy module according to the energy generation status information of the energy generation module, the energy storage information of the energy storage module and the demand status information of the power grid may be as follows:

In case where the demand status information of the power grid is that there is power demand, if the energy generation status information of the energy generation module is in energy-generation, and/or, the energy storage information of the energy storage module meets the preset energy storage condition, it is determined to release electric energy from the electric energy module to the power grid. In case where the demand status information of the power grid is that there is no power demand, if the energy generation status information of the energy generation module is in stopped energy-generation, and the energy storage information of the energy storage module does not meet the energy storage condition, then it is determined to obtain electric energy from the power grid for the electric energy module.

In this case, the energy storage information of the energy storage module meeting the preset energy storage condition, may be set as that the amount of energy stored in the above energy storage module is greater than a preset value. Naturally, the energy storage information of the energy storage module not meeting the preset energy storage condition, may be set as that the amount of energy stored in the above energy storage module is less than or equal to the preset value.

That is, the determination of releasing electric energy from the electric energy module to the power grid has the following corresponding set conditions: when the demand status information of the power grid is that there is power demand, the energy generation status information of the energy generation module is in energy-generation, and/or, the amount of energy stored in the energy storage module is greater than the preset value. The determination of obtaining electric energy from the power grid for the electric energy module has the following corresponding set conditions: when the demand status information of the power grid is that there is no power demand, the energy generation status information of the energy generation module is in stopped energy-generation and the amount of energy stored in the energy storage module is less than the preset value.

In this embodiment, all possible flow directions of the electric energy in the power system are analyzed by combining the different combinations of the energy generation status information of the energy generation module, the energy storage information of the energy storage module and the demand status information of the power grid. Based on this, the relationship condition between the energy generation status information of the energy generation module, the energy storage information of the energy storage module and the demand information of the power grid corresponding to different flow directions of the electric energy are determined. The controller only needs to match the current specific data of the energy generation status information of the energy generation module, energy storage information of the energy storage module and demand status information of the power grid with the relationship condition, and can quickly and accurately determine whether to release electric energy from the electric energy module to the power grid or to obtain electric energy from the power grid for the electric energy module.

In practice, it is possible to design the implementations of the first current conversion module and the second current conversion module in the power system based on different needs, and the number of the first current conversion module and the second current conversion module in different implementations may be one or multiple. Based on this, the following explains in detail how to obtain electric energy from the power grid through the first current conversion module and release electric energy to the power grid through the first current conversion module and the second current conversion module by combining cases where the numbers of the first current conversion module and the second current conversion module in the power system are different.

In one embodiment, the first current conversion module includes at least one first current conversion submodule, and the second current conversion module includes at least one second current conversion submodule. The above-mentioned obtaining electric energy from the power grid through the first current conversion module includes: determining at least one first target current conversion submodule from the respective first current conversion submodules, and obtaining electric energy from the power grid through the respective first target current conversion submodule. And the above-mentioned releasing electric energy to the power grid through the first current conversion module and the second current conversion module includes:

determining at least one second target current conversion submodule from the respective first current conversion submodules and the respective second current conversion submodules, and releasing electric energy to the power grid through the respective second target current conversion submodule.

If the number of the first current conversion module and the number of the second current conversion module in the power system are both one, the first target current conversion submodule refers to the first current conversion module, and the second target current conversion submodule refers to the second current conversion module.

If the number of the first current conversion modules and the number of the second current conversion modules in the power system are both multiple, in one embodiment, determining at least one first target current conversion submodule from the respective first current conversion submodules may be selecting the first current conversion submodule that meets the preset operating condition from the multiple first current conversion submodules as the respective first target current conversion submodule.

In another embodiment, determining at least one second target current conversion submodule from the respective first current conversion submodules and the respective second current conversion submodules may be selecting the first current conversion submodule that meets the preset operating condition from the respective first current conversion submodules, and selecting the second current conversion submodule that meets the preset operating condition from the respective second current conversion submodules, to obtain the respective second target current conversion submodule.

In this solution, in the power system, the first current conversion module includes multiple first current conversion submodules, and the second current conversion module includes multiple second current conversion submodules, that is, the designed implementations of the first current conversion module and the second current conversion module as shown in FIG. 4 above.

Then, in practice, consider the following: (1) although the multiple first current conversion submodules or the multiple second current conversion submodules have been expanded in a certain scene based on demand, there may be cases in the subsequent use that it is not necessary to use all the first current conversion submodules or all the second current conversion submodules. In this case, it is needed to select the operable submodule from the multiple first current conversion submodules as the corresponding first target current conversion submodule, and select the operable submodule from the multiple second current conversion submodules as the corresponding second target current conversion submodule. (2) if in the power system, although the multiple first current conversion submodules or the multiple second current conversion submodules have been expanded, it is found in a subsequent use process that there is damaged current conversion submodule in the multiple first current conversion submodules or the multiple second current conversion submodules, at this time the damaged current conversion submodule cannot operate, that is, it cannot be taken as the target current conversion submodule.

Based on the special circumstances listed above, the preset operating condition may be set according to whether the respective current conversion submodule is damaged, or whether the maximum power output in the current system does not need to use some converter submodule, and etc., so as to eliminate the damaged current conversion submodule or the redundant and unused current conversion submodule. The embodiments of the disclosure do not limit the specific considerations for setting the operating condition, as long as the target current conversion submodule with reasonable performance and normal operation may be selected.

The process of determining at least one first target current conversion submodule from the respective first current conversion submodules, and the process of determining at least one second target current conversion submodule from the respective first current conversion submodules and the respective second current conversion submodules, only differ in that one process only needs to use the first current conversion submodules, and one process needs to use both the first current conversion submodules and the second current conversion submodules.

In the embodiment, the determination of the target current conversion submodule is made regarding to case where the number of the first current conversion module and the number of the second current conversion module in the power system are different. By setting the manner for judging the target current conversion submodule with different numbers respectively, and the targeted setting improves the accuracy of determining the target current conversion submodule, ensuring the matching between the determined target current conversion submodule and the power system.

Further, on the basis of the above embodiments, it is possible to combine the different flow directions of electric energy of the electric energy module and the power grid to determine the required operating power for the corresponding current conversion module, so that the operating power of the current conversion modules in the power system may be reasonably configured, and the use efficiency of the current conversion modules configured in the power system may be improved.

Therefore, in one embodiment, the power system control method provided by the embodiments of the disclosure may also includes: configuring the operating power for the respective first target current conversion submodule according to the maximum demand power of the electric energy module.

Based on the respective first target current conversion submodule determined in the above steps, the controller configures the operating power for the respective first target current conversion submodule according to the maximum demand power of the electric energy module. For example, in practice, the rated power of all current conversion modules configured in the power system may be stored in the database in advance, so that the controller may obtain the rated power corresponding to the respective first target current conversion submodule from the database according to the identification of the respective first target current conversion submodule.

Further, the controller also needs to obtain the maximum demand power of the electric energy module, for example, the maximum charging power required by the energy storage battery or the maximum power output from the power grid in the process of the power grid charging the energy storage battery.

Figure 13:
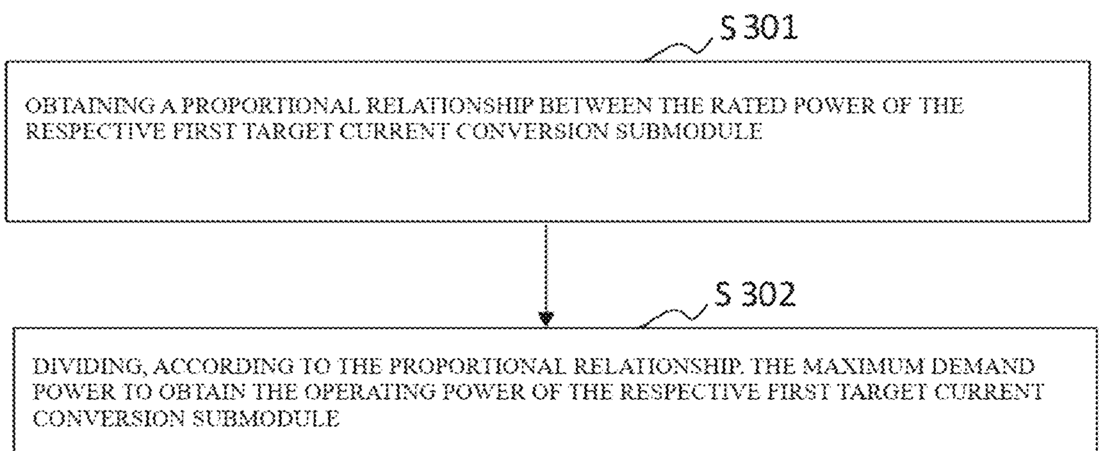
FIG. 13 is a schematic flow chart of a power system control method provided in another embodiment.

The following is an embodiment that provides an implementation for the process of configuring the operating power of the respective first target current conversion submodule in the above embodiment. Then in one embodiment, as shown in FIG. 13, the above S102 includes the following steps:

S301, obtaining a proportional relationship between the rated power of the respective first target current conversion submodule.

The controller obtains from the power system the determined currently operable respective first target current conversion submodule, and also needs to obtain the rated power of the respective first target current conversion submodule, and obtains, after that, the proportional relationship between the rated power of the respective first target current conversion submodule.

S302, dividing, according to the proportional relationship, the maximum demand power to obtain the operating power of the respective first target current conversion submodule.

After determining the proportional relationship, the controller divides the maximum demand power of the electric energy module according to the proportional relationship, and obtains the configurable operating power of each first target current conversion submodule.

For example, suppose the currently determined first target current conversion submodule includes the first target current conversion submodule 1, the first target current conversion submodule 2 and the first target current conversion submodule 3, and the proportional relationship of the rated power of the three first target current conversion submodules is a/b/c;

Then the operating power of the first target current conversion submodule 1 may be determined as: $M^*(a/(a+b+c))$; the operating power of the first target current conversion submodule 2 is: $M^*(b/(a+b+c))$; and the operating power of the first target current conversion submodule 3 is: $M^*(c/(a+b+c))$.

In the embodiment, obtain the proportional relationship between the rated power of the respective first target current conversion submodule according to the rated power of the respective first target current conversion submodule, and then divide the maximum demand power of the electric energy module according to the proportional relationship to obtain the operating power configured to the respective first target current conversion submodule. The proportional relationship may reflect the current conversion capacity that the respective first target current conversion submodule may carry, and it can be used as the basis for the respective power configuration, which may avoid the current conversion modules from overload and damage. And by taking the respective carrying capacity as the basis for the respective power configuration, the power configuration may be made more reasonable.

In another embodiment, the respective second target current conversion submodule is determined based on the above, and the operating power is configured for the respective second target current conversion submodule according to the maximum output power of the electric energy module.

Similarly, based on the respective second target current conversion submodule determined in the above step, the controller configures the operating power for the respective second target current conversion submodule according to the maximum output power of the electric energy module. For example, in practice, the rated power of all the current conversion modules configured in the power system may be stored in the database in advance, so that the controller may obtain the rated power of the corresponding second target current conversion submodule from the database according to the identification of the determined respective second target current conversion submodule.

Further, the controller also needs to obtain the maximum output power of the electric energy module, for example, the maximum discharging power of the photovoltaics and/or energy storage battery in the process of the photovoltaics and/or energy storage battery discharging to the power grid.

An embodiment is also provided below, which provides an implementation for the process of configuring the operating power for the respective second target current conversion submodule in the above embodiments. Then in one embodiment, the following are included: obtaining the proportional relationship between the rated power of the respective second target current conversion submodule; dividing, according to the proportional relationship, the maximum output power, to obtain the operating power of the respective second target current conversion submodule.

The controller obtains from the power system the determined currently operable respective second target current conversion submodule, and also needs to obtain the rated power of the respective second target current conversion submodule, and obtains, after that, the proportional relationship between the rated power of the respective second target current conversion submodule.

After determining the proportional relationship, the controller divides the maximum output power of the electric energy module according to the proportional relationship, and obtains the configurable operating power of each second target current conversion submodule.

For the specific process one may refer to the aforementioned process of determining the operating power of the respective first target current conversion submodule, which is not limited in the embodiments of the disclosure.

In the embodiment, obtain the proportional relationship between the rated power of the respective second target current converter submodule according to the rated power of the respective second target current conversion submodule, and then divide the maximum output power of the electric energy module according to the proportional relationship to obtain the operating power configured to the respective second target current conversion submodule. The proportional relationship may reflect the current conversion capacity that the respective second target current conversion submodule may carry, and it can be used as the basis for the respective power configuration, which may avoid the current conversion module from overload and damage. And by taking the respective carrying capacity as the basis for the respective power configuration, the power configuration may be made more reasonable.

After configuring the operating power of the respective first target current conversion submodule and the respective second target current conversion submodule, it is possible to control the respective target current conversion submodule to operate at the operating power of the respective target current conversion submodule to complete the electric energy interaction between the electric energy module and the power grid.

It is understood that in the embodiments of the disclosure, after configuring the operating power for the determined operable target current conversion submodule, control the respective target current conversion submodule to operate at the configured operating power. While other non-operable current conversion submodules are all in a off state, that is, they do not operate. In this way, configuring the operating power for the respective target current conversion submodule with the maximum output power or the maximum demand power of the electric energy module corresponding to the current flow direction of the electric energy, is equivalent to reasonably allocating the maximum output power or the maximum demand power of the electric energy module to the currently operable target current conversion submodules, so that each target current conversion submodule may be used reasonably, thereby improving the use efficiency of the current conversion modules configured in the power system.

It should be understood that although the steps in the flow chart involved in the embodiments described above are shown sequentially as indicated by the arrows, the steps are not necessarily executed sequentially in the order indicated by the arrows. Unless explicitly stated herein, there is no strict order in which these steps can be executed and the steps may be performed in other order. Moreover, at least some of the steps in the flow chart referred to in the embodiments mentioned above may include multiple steps or stages, which are not necessarily completed at the same time, but may be executed at different times, and the sequence of execution of these steps or stages is not necessarily sequential, but may be performed alternately or interchangeably with other steps or with at least part of steps or stages within other steps.

The embodiments of the disclosure also provide a power allocation device for implementing the above power system control method. The implemented solutions provided by the device to solve the problem are similar to the implemented solutions recited in the above method, so for the specific limits of the one or more power allocation device embodiments provided below, one may refer to the limits of the power system control method mentioned above, which will not be repeated here.

Figure 14:
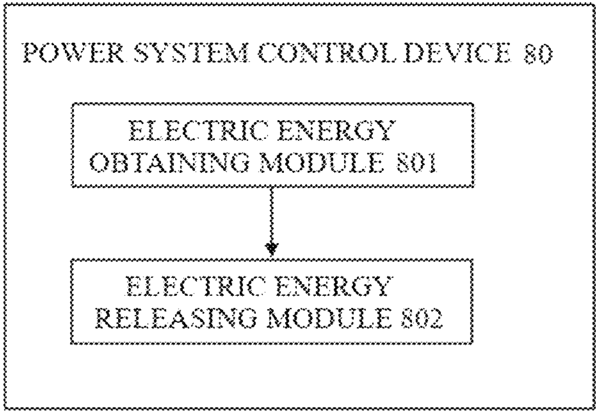
FIG. 14 is a structural block diagram of a power system control device provided in one embodiment.

In one embodiment, as shown in FIG. 14, a power system control device 80 is provided, which includes: an electric energy obtaining module 801 and an electric energy releasing module 802;

The electric energy obtaining module 801 is used for obtaining electric energy from the power grid through the first current conversion module in response to the determination of obtaining electrical energy from the power grid for the electric energy module;

The electric energy releasing module 802 is used for releasing electric energy to the power grid through the first current conversion module and the second current conversion module in response to the determination of releasing electric energy from the electric energy module to the power grid.

In one embodiment, the device also includes a parameter obtaining module and a determining module:

The parameter obtaining module is used for obtaining the energy generation status information of the energy generation module, the energy storage information of the energy storage module, and the demand status information of the power grid;

The determining module is used for making a determination of releasing electric energy from the electric energy module to the power grid, or a determination of obtaining electric energy from the power grid for the electric energy module according to the energy generation status information of the energy generation module, the energy storage information of the energy storage module and the demand status information of the power grid.

In one embodiment, the above determining module includes:

A first determining unit, which is used for making the determination of releasing electric energy from the electric energy module to the power grid in case where the demand status information of the power grid is that there is power demand, if the energy generation status information of the energy generation module is in energy-generation, and/or, the energy storage information of the energy storage module meets the preset energy storage condition;

A second determining unit, which is used for making the determination of obtaining electric energy from the power grid for the electric energy module in case where the demand status information of the power grid is that there is no power demand, if the energy generation status information of the energy generation module is in stopped energy-generation, and the energy storage information of the energy storage module does not meet the energy storage condition.

In one embodiment, the first current conversion module includes at least one first current conversion submodule, the second current conversion module includes at least one second current conversion submodule, and the electric energy obtaining module 801 is also used for determining at least one first target current conversion submodule from the respective first current conversion submodules, to obtain electric energy from the power grid through the respective first target current conversion submodule;

The above electric energy releasing module 802 is also used for determining at least one second target current conversion submodule from the respective first current conversion submodules and the respective second current conversion submodules, to release electric energy to the power grid through the respective second target current conversion submodule.

In one embodiment, the above electric energy obtaining module 801 is also used for selecting the first current conversion submodule that meets the preset operating condition from the respective first current conversion submodules and determining it as the respective first target current conversion submodule.

In one embodiment, the above electric energy releasing module 802 is also used for selecting the first current conversion submodule that meets the preset operating condition from the respective first current conversion submodules, and selecting the second current conversion submodule that meets the preset operating condition from the respective second current conversion submodules, to obtain the respective second target current conversion submodule.

In one embodiment, the device also includes: a first power configuration module, which is used for configuring the operating power for the respective first target current conversion submodule according to the maximum demand power of the electric energy module.

In one embodiment, the first power configuration module is also used for obtaining the proportional relationship between the rated power of the respective first target current conversion submodule; dividing, according to the proportional relationship, the maximum demand power, to obtain the operating power of the respective first target current conversion submodule.

In one embodiment, the device also includes: a second power configuration module, which is used for configuring the operating power of the respective second target current conversion submodule according to the maximum output power of the electric energy module.

In one embodiment, the second power configuration module is also used for obtaining the proportional relationship between the rated power of the respective second target current conversion submodule; dividing, according to the proportional relationship, the maximum output power, to obtain the operating power of the respective second target current conversion submodule.

In one embodiment, the first current conversion module is used to convert the DC current output by the electric energy module into the AC current, or convert the AC current output by the power grid into the DC current, and the second current conversion module is used to convert the DC current output by the electric energy module to the AC current.

The respective modules in the above power system control device may be realized in whole or in part by software, hardware and their combination. The above respective modules may be embedded in as a hardware or independent of the processor in the computer device, and may also be stored as a software in the memory of the computer device, so that the processor may call and execute the corresponding operations of the above respective modules.

In one embodiment, a computer device is provided, which includes a memory and a processor, where a computer program is stored in the memory, and when executing the computer program, the processor implements the technical solutions of the power system control method provided in any of the above embodiments.

The realization principle and technical effect of the computer device provided in the above embodiments are similar to those of the above method embodiments and will not be repeated here.

In one embodiment, a computer-readable storage medium is provided, which stores thereon a computer program, which, when executed by a processor, implements the technical solutions of the power system control method provided in any of the above embodiments.

The realization principle and technical effect of the computer-readable storage medium provided in the above embodiments are similar to those of the above method embodiments and will not be repeated here.

In one embodiment, a computer program product is provided, which includes a computer program, which, when executed by a processor, implements the technical solutions of the power system control method provided in any of the above embodiments.

The realization principle and technical effect of the computer program product provided in the above embodiments are similar to those of the above method embodiments and will not be repeated here.

Those skilled in the art may understand that the process realizing the whole or part of the above method in the embodiments may be accomplished by instructing the relevant hardware through a computer program, and the computer program may be stored in a non-volatile computer-readable storage medium, and the computer program, when executed, may include the processes of the embodiments of the above methods. In this case, any reference to the memory, database or other medium used in the embodiments provided herein may include at least one of the non-volatile and volatile memory. The non-volatile memory may include a read-only memory (ROM), a magnetic tape, a floppy disk, a flash Memory, an optical memory, a high-density embedded non-volatile memory, a resistive random access memory (ReRAM), a Magnetoresistive Random Access Memory (MRAM), a Ferroelectric Random Access Memory (FRAM), a Phase Change Memory (PCM), a graphene memory, etc. The volatile memory may include a Random Access Memory (RAM) or external cache memory, etc. As an illustration rather than a limitation, RAM may be in many forms, such as a Static Random Access Memory (SRAM) or a Dynamic Random Access Memory (DRAM). The processor referred to in the embodiments provided in the disclosure may be a general-purpose processor, a central processing processor, a graphics processor, a digital signal processor, programmable logics, data processing logics based on quantum computing, etc., but is not limited to this.

Finally, it should be noted that the above embodiments are used only to illustrate the technical solutions of the disclosure, rather than limit it. Although the detailed description of the disclosure has been provided with reference to the above embodiments, it should be understood by those skilled in the art that it is possible to modify the technical solutions recited in the above embodiments, or make equivalent replacement of some or all of the technical features thereof. While such modification or replacement shall not make the essence of the corresponding technical solutions depart from the scope of the technical solutions of the respective embodiments of the disclosure, which shall be covered in the scope of the claims and specification of the present disclosure. In particular, the technical features referred to in the various embodiments may be combined in any manner, provided that there is no structural conflict. The disclosure is not limited to the specific embodiments disclosed herein, but includes all technical solutions falling within the scope of the claims.

What is claimed is:

1. A power system control method, wherein the power system comprises a first current conversion module and a second current conversion module, a DC side of the first current conversion module and a DC side of the second current conversion module are both connected to an electric energy module, an AC side of the first current conversion module and an AC side of the second current conversion module are both connected to a power grid, and the electric energy module comprises an energy generation module and an energy storage module, the method comprising:

obtaining energy generation status information of the energy generation module, energy storage information of the energy storage module, and demand status information of the power grid;

making a determination of releasing electric energy from the electric energy module to the power grid, or making a determination of obtaining electric energy from the power grid for the electric energy module, according to the energy generation status information of the energy generation module, the energy storage information of the energy storage module, and the demand status information of the power grid, comprising:

making the determination of releasing electric energy from the electric energy module to the power grid, in case where the demand status information of the power grid is that there is power demand, in response to the energy generation status information of the energy generation module being in energy-generation, and/or, the energy storage information of the energy storage module meeting a preset energy storage condition; and making the determination of obtaining electric energy from the power grid for the electric energy module, in case where the demand status information of the power grid is that there is no power demand, in response to the energy generation status information of the energy generation module being in stopped energy-generation, and the energy storage information of the energy storage module not meeting the energy storage condition;

obtaining, in response to the determination of obtaining electric energy from the power grid for the electric energy module, electric energy from the power grid through the first current conversion module; and releasing, in response to the determination of releasing electric energy from the electric energy module to the power grid, electric energy to the power grid through the first current conversion module and the second current conversion module.

2. The method according to claim 1, wherein the first current conversion module comprises at least one first current conversion submodule, the second current conversion module comprises at least one second current conversion submodule, and obtaining electric energy from the power grid through the first current conversion module comprises:

determining at least one first target current conversion submodule from the respective first current conversion submodule, and obtaining electric energy from the power grid through the respective first target current conversion submodule; and releasing electric energy to the power grid through the first current conversion module and the second current conversion module comprises: determining at least one second target current conversion submodule from the respective first current conversion submodule and the respective second current conversion submodule, and releasing electric energy to the power grid through the respective second target current conversion submodule.

3. The method according to claim 2, wherein determining at least one first target current conversion submodule from the respective first current conversion submodule comprises:

selecting first current conversion submodule that meets a preset operating condition from the respective first current conversion submodule as the respective first target current conversion submodule.

4. The method according to claim 2, wherein determining at least one second target current conversion submodule from the respective first current conversion submodule and the respective second current conversion submodule comprises:

selecting first current conversion submodule that meets a preset operating condition from the respective first current conversion submodule, and selecting second current conversion submodule that meets a preset operating condition from the respective second current conversion submodule, to obtain the respective second target current conversion submodule.

5. The method according to claim 2, further comprising:

configuring operating power for the respective first target current conversion submodule according to a maximum demand power of the electric energy module.

6. The method according to claim 5, wherein configuring the operating power for the respective first target current conversion submodule according to the maximum demand power of the electric energy module comprises:

obtaining a proportional relationship between rated power of the respective first target current conversion submodule; and dividing, according to the proportional relationship, the maximum demand power, to obtain the operating power of the respective first target current conversion submodule.

7. The method according to claim 2, further comprising:

configuring operating power for the respective second target current conversion submodule according to a maximum output power of the electric energy module.

8. The method according to claim 7, wherein configuring the operating power for the respective second target current conversion submodule according to the maximum output power of the electric energy module comprises:

obtaining a proportional relationship between rated power of the respective second target current conversion submodule; and dividing, according to the proportional relationship, the maximum output power, to obtain the operating power of the respective second target current conversion submodule.

9. The method according to claim 1, wherein:

the first current conversion module is used to convert a DC current output by the electric energy module into an AC current, or convert an AC current output by the power grid into a DC current; and the second current conversion module is used to convert a DC current output by the electric energy module to an AC current.

10. A computer device comprising a memory and a processor, wherein a computer program is stored in the memory, and the processor is configured to execute the computer program to cause the computer device to implement the method according to claim 1.

11. A non-transitory computer-readable storage medium on which a computer program is stored, wherein the computer program, when executed by a computer device, causes the computer device to implement the method according to claim 1.

12. A computer program product comprising a computer program, wherein the computer program, when executed by a computer device, causes the computer device to implement the method according to claim 1.

13. A power system, comprising:

a first current conversion module;

a second current conversion module;

an energy generation module;

an energy storage module; and a controller connected with the first current conversion module and the second current conversion module;

wherein:

a DC side of the first current conversion module and a DC side of the second current conversion module are both connected to an electric energy module;

an AC side of the first current conversion module and an AC side of the second current conversion module are both connected to a power grid;

the first current conversion module is used for obtaining electric energy from the power grid for the electric energy module;

the first current conversion module and the second current conversion module are used for releasing electric energy from the electric energy module to the power grid; and the controller is configured to:

obtain energy generation status information of the energy generation module, energy storage information of the energy storage module, and demand status information of the power grid;

make a determination of releasing electric energy from the electric energy module to the power grid, or making a determination of obtaining electric energy from the power grid for the electric energy module, according to the energy generation status information of the energy generation module, the energy storage information of the energy storage module, and the demand status information of the power grid, comprising:

making the determination of releasing electric energy from the electric energy module to the power grid, in case where the demand status information of the power grid is that there is power demand, in response to the energy generation status information of the energy generation module being in energy-generation, and/or, the energy storage information of the energy storage module meeting a preset energy storage condition; and making the determination of obtaining electric energy from the power grid for the electric energy module, in case where the demand status information of the power grid is that there is no power demand, in response to the energy generation status information of the energy generation module being in stopped energy-generation, and the energy storage information of the energy storage module not meeting the energy storage condition;

obtain, in response to the determination of obtaining electric energy from the power grid for the electric energy module, electric energy from the power grid through the first current conversion module; and release, in response to the determination of releasing electric energy from the electric energy module to the power grid, electric energy to the power grid through the first current conversion module and the second current conversion module.

14. The system according to claim 13, wherein:

the energy generation module is connected with the energy storage module;

the energy generation module is connected with the DC side of the first current conversion module and the DC side of the second current conversion module; and the energy storage module is connected with the DC side of the first current conversion module and the DC side of the second current conversion module.

15. The system according to claim 14, further comprising:

a first expansion interface; and a second expansion interface;

wherein:

the first expansion interface is used for increasing number of first current conversion submodule in the first current conversion module; and the second expansion interface is used for increasing number of second current conversion submodule in the second current conversion module.

16. A power system control method, wherein the power system comprises a first current conversion module and a second current conversion module, a DC side of the first current conversion module and a DC side of the second current conversion module are both connected to an electric energy module, an AC side of the first current conversion module and an AC side of the second current conversion module are both connected to a power grid, the first current conversion module comprises at least one first current conversion submodule, and the second current conversion module comprises at least one second current conversion submodule, the method comprising:

obtaining, in response to a determination of obtaining electric energy from the power grid for the electric energy module, electric energy from the power grid through the first current conversion module, comprising:

determining at least one first target current conversion submodule from the respective first current conversion submodule, and obtaining electric energy from the power grid through the respective first target current conversion submodule; and releasing, in response to a determination of releasing electric energy from the electric energy module to the power grid, electric energy to the power grid through the first current conversion module and the second current conversion module, comprising:

determining at least one second target current conversion submodule from the respective first current conversion submodule and the respective second current conversion submodule, and releasing electric energy to the power grid through the respective second target current conversion submodule.

* * * * *